June 15, 1926.  
W. A. CANNON  
1,588,702  
DIRIGIBLE LAMP  
Filed July 7, 1924  
2 Sheets-Sheet 1
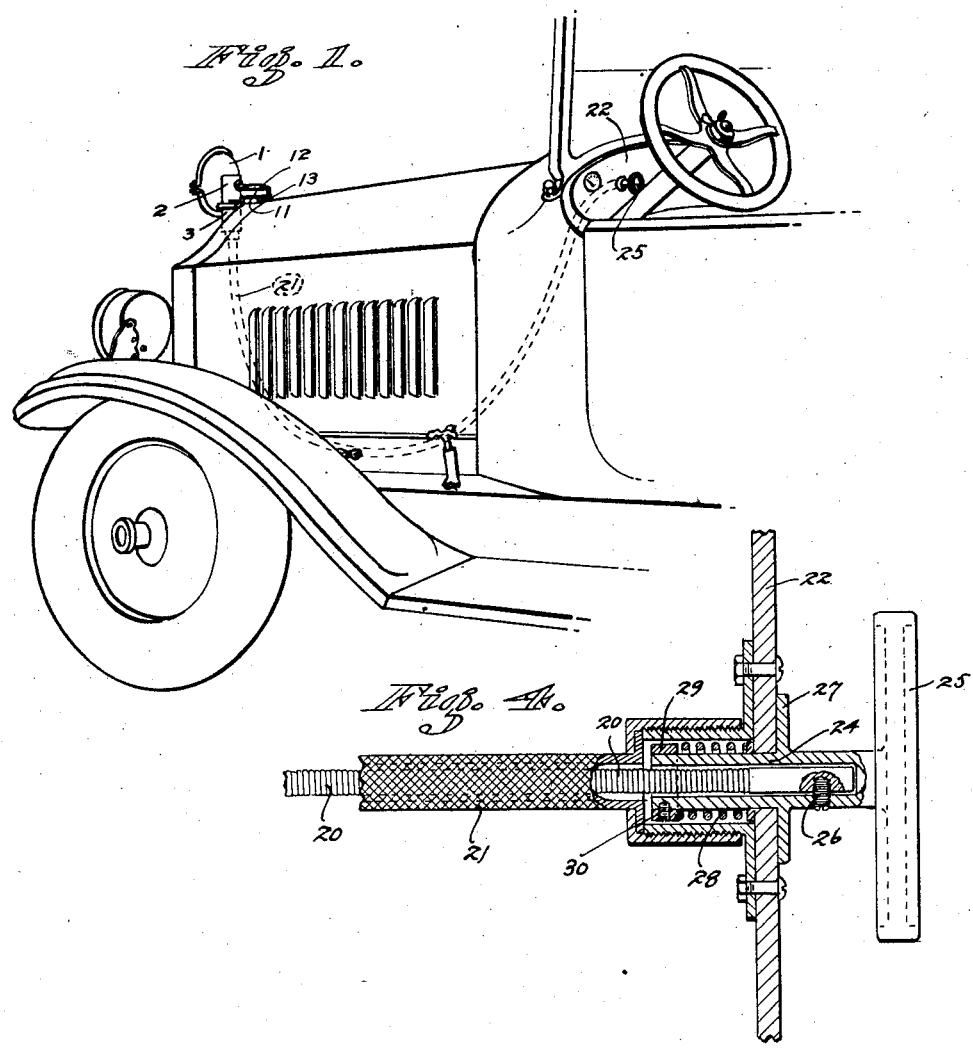
Inventor  
WILLIAM A. CANNON  
By  
Attorneys June 15, 1926.
W. A. CANNON
DIRIGIBLE LAMP
Filed July 7, 1924
1,588,702
2 Sheets-Sheet 2
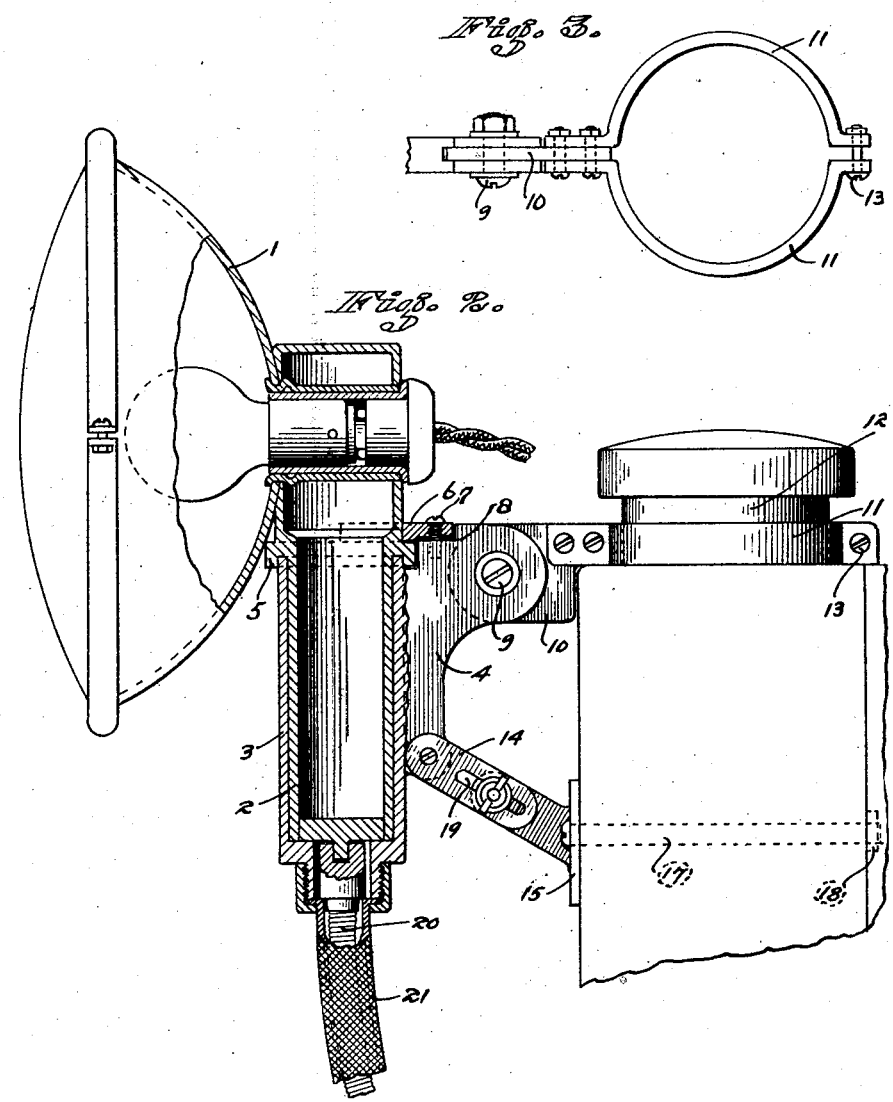
Inventor
WILLIAM A. CANNON
By
Attorneys Patented June 15, 1926.

1,588,702

UNITED STATES PATENT OFFICE.

WILLIAM A. CANNON, OF CARMEL, CALIFORNIA.

DIRIGIBLE LAMP.

Application filed July 7, 1924. Serial No. 724,653.

This invention relates to dirigible lamps as used for headlights or spotlights on automobiles and other vehicles, and has for its objects a simplified construction of such lamps whereby the movement of the lamp may be easily controlled from a distance, an elimination of all gears and ratchet devices as usually used on such apparatus so that a smoother operation results, also a weatherproof construction suitable for any installation at any point on an automobile, but particularly adapted for clamping to the filler tube of the automobile radiator.

These objects are realized in the construction shown in the accompanying drawings and in which:—

Figure 1 is a perspective sketch of the forward end of an automobile showing my dirigible lamp secured to the radiator and having an operating extension to the instrument board.

Figure 2 is an enlarged elevation of the lamp body and supporting bracket showing a part of the radiator and with a portion of the lamp structure broken away to show the flexible operating shaft connection.

Figure 3 is a plan view of the clamping end of the bracket, and Figure 4 is an enlarged sectional view of the controlling arrangement secured to the instrument board.

In the drawings, 1 indicates the lamp body provided with a cylindrical piece 2 extending within the socket 3 of a supporting bracket 4.

The cylinder 2 is free to revolve in the socket 3 and has an overhanging flange at 5 adapted to form a guard against rain and dust entering between the socket and cylindrical piece, also providing a shoulder upon which a retainer 6 seats for holding the lamp in place and permitting of easy removal of the lamp from the bracket when desired.

The retainer 6 is secured to the bracket by a screw 7 having a spring washer 8 under its head so that the retainer may be forced against the shoulder with a slightly resilient pressure to slightly restrict the revolving of the lamp within the supporting socket.

The bracket 4 has a pivotal connection 9 to an extension 10 provided with a pair of curved clamping arms 11 adapted to clamp around the radiator filling tube 12 by drawing up on the bolt 13.

The pivotal connection 9 permits the lamp to be directed to any desired angle and rigidly clamped in such a position, yet does not interfere with its freedom to revolve in the socket 3, for horizontal direction of its light ray.

The bracket 4 has preferably an angular brace 14 having a flange 15 secured to the face of the radiator 16 by a small bolt 17 extending through the mesh of the radiator and having a nut 18 on its inner end.

The brace 14 is jointed and slotted at 19 to permit initial setting of the bracket to the desired angle, and the rotary adjustment of the lamp in the socket 3 is secured through means of a flexible shaft 20 secured to the lower end of the cylindrical piece 2.

This flexible shaft may be a piece of flexible metallic tubing, flexible metal cord, chain, or similar device and is enclosed in a flexible housing 21 secured to the lower end of the socket.

The flexible shaft and housing extend from wherever the lamp is positioned on the automobile to the instrument board 22 where, as shown in Figure 4, the housing clamps to a flange 23 secured to the board and the flexible shaft passes into a hollow extension 24 of a controlling knob 25 and is secured by a set screw 26. The extension 24 is free to revolve in an opening in the instrument board and has a flange 27 bearing against the face of the board, while at the other side of the board the extension is surrounded by a compression spiral spring 28 reacting between the board and a collar 29 screwed on the end of the extension and held by the set screw 30.

The spring 28 forces the flange 27 tightly against the board so that the resulting friction upon turning the knob 25 will lock the shaft and thereby the lamp at any position to which it may have been revolved, thus providing a smooth working device without ratchets or other auxiliaries.

To adjust the frictional pressure of the flange 27 against the board, the spring 28 may be tightened or relaxed by suitable adjustment of the collar 29.

In reference to the lamp holding bracket 4 it should be noted that while this is shown clamped to the radiator tube as my preferred arrangement, it may be modified so as to adapt it for clamping to any other portion of the automobile desired.

I claim:—

A dirigible lamp of the character described comprising a bracket adapted to be clamped to a portion of an automobile, said bracket having a socket thereon, a lamp rotatably positioned in said socket, said lamp having a flange overhanging the upper edge of the socket, a retainer on the bracket engaging the flange to hold the lamp revolvably seated in the socket, a flexible shaft connected at one end to the lamp axially in line with its point of revolution and extending to a distant point on the automobile, a knob secured to the remote end of the flexible shaft for turning the same, and frictional means associated with the knob adapted to hold it at any point of revolution.

WILLIAM A. CANNON.